(12) United States Patent
Johnson et al.

(10) Patent No.: US 7,148,420 B1
(45) Date of Patent: Dec. 12, 2006

(54) ELECTRICAL CEILING BOX FOR FIXTURE SUPPORT

(75) Inventors: Steven J. Johnson, Galien, MI (US); Krzysztof W. Korcz, Granger, IN (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/131,325

(22) Filed: May 18, 2005

(51) Int. Cl.
*H01H 9/02* (2006.01)

(52) U.S. Cl. ............................ 174/58; 174/50; 174/53; 220/3.2; 220/3.3; 248/906

(58) Field of Classification Search .................. 174/48, 174/49, 50, 53, 58, 57, 63, 61, 65 R, 480, 174/481; 220/3.2, 3.3, 3.4, 3.5, 3.6, 3.7, 220/3.8, 4.02; 248/906, 343; 435/535; D13/152
See application file for complete search history.

(56) References Cited

U.S. PATENT DOCUMENTS

| | | | | |
|---|---|---|---|---|
| 2,423,757 | A | * | 7/1947 | Dedge .................... 248/906 |
| 3,568,135 | A | | 3/1971 | Rogers |
| 4,315,100 | A | * | 2/1982 | Haslbeck et al. ............. 220/3.2 |
| 4,408,696 | A | | 10/1983 | Crosson |
| 4,580,689 | A | * | 4/1986 | Slater .......................... 220/3.2 |
| 4,874,905 | A | * | 10/1989 | Schnell et al. ............. 174/65 R |
| 4,892,211 | A | * | 1/1990 | Jorgensen .................... 220/3.2 |
| 4,954,667 | A | * | 9/1990 | Jorgensen et al. ............. 174/53 |
| 5,135,411 | A | * | 8/1992 | Wiley et al. ................ 439/535 |
| 5,857,581 | A | | 1/1999 | Jorgensen |
| 5,883,331 | A | | 3/1999 | Reiker |
| 5,907,124 | A | * | 5/1999 | Reiker ......................... 248/906 |
| 5,931,432 | A | | 8/1999 | Herold et al. |
| 5,950,853 | A | | 9/1999 | Jorgensen |
| 5,988,421 | A | | 11/1999 | Jorgensen |
| 6,207,898 | B1 | * | 3/2001 | Reiker ......................... 174/61 |
| 6,303,862 | B1 | | 10/2001 | Reiker |
| 6,335,486 | B1 | | 1/2002 | Reiker |
| 6,646,201 | B1 | | 11/2003 | Gretz |
| 6,677,523 | B1 | | 1/2004 | Gretz |
| 6,720,496 | B1 | | 4/2004 | Weeks |
| 6,909,045 | B1 | * | 6/2005 | Halbert ........................ 174/50 |

* cited by examiner

*Primary Examiner*—Angel R. Estrada
(74) *Attorney, Agent, or Firm*—Alfred N. Goodman; Mark S. Licks; Garrett V. Davis

(57) ABSTRACT

An electrical box has a side wall with at least one mounting flange that is contained completely within the perimeter of the side wall. The flange is coupled to the side wall along a common non-linear edge to resist bending of the flange along the joining edge with the side wall. In one embodiment, the electrical box has a substantially circular side wall with at least one recessed portion. The mounting flange is connected to the upper edge of the recessed portion and is positioned within a radius of the circular side wall.

33 Claims, 6 Drawing Sheets

ELECTRICAL CEILING BOX FOR FIXTURE SUPPORT

FIELD OF THE INVENTION

The present invention is directed to an electrical box and to an electrical box assembly for supporting an electrical fixture. More particularly, the invention is directed to an electrical box having mounting holes within the perimeter of the box for supporting an electrical fixture such as a ceiling fan or light fixture.

BACKGROUND OF THE INVENTION

Electrical boxes are used to mount electrical fixtures such as ceiling fans and light fixtures. The electrical boxes commonly have tabs or flanges connected to a side wall that extend into the center of the box. The tabs include holes for receiving screws for fastening the electrical fixture to the box and for supporting the electrical fixture. The electrical box also encloses the wires and the electrical connections between the power supply and the electrical fixture. Care must be taken when mounting the electrical fixture to the electrical box to prevent the mounting screws from contacting and damaging the electrical wires within the box. Examples of electrical boxes that have inwardly extending mounting tabs are disclosed in U.S. Pat. No. 5,988,421 and U.S. Pat. No. 5,883,331.

Other electrical boxes are also known that include mounting holes for mounting the electrical box to a support. The mounting holes can be provided in the bottom wall. In other electrical boxes, the side wall is formed with a block that has a hole extending completely through the block to receive the mounting screw. Examples of such electrical boxes are disclosed in U.S. Pat. No. 6,646,201; U.S. Pat. No. 6,207,898 and U.S. Pat. No. 6,335,486.

Many different types of electrical boxes are known in the art for use as ceiling boxes. Most of the prior ceiling boxes were designed either specifically for supporting ceiling fans or specifically for supporting light fixtures. The electrical boxes that are typically used for ceiling fan support are different than those used for supporting light fixtures. In particular, electrical boxes for supporting ceiling fans typically use standard 10–32 screws, while electrical boxes for light fixture support use standard 8–32 screws. Moreover, Underwriters Laboratories (UL) has a test that electrical ceiling boxes must pass in order to be used as the sole support of a ceiling fan. Typically, a conventional electrical box used for supporting a light fixture or the like can not be used for supporting a ceiling fan.

Accordingly, when an electrical box is installed in a ceiling, the installer must determine whether a ceiling fan or a light fixture will be attached to the electrical box so that the correct type of electrical box is installed. If a light fixture type electrical box is initially installed at a particular location and then subsequently it is decided that a ceiling fan should be installed at that location, the original electrical box must typically either be modified or replaced with an electrical box which is approved for ceiling fan support. Adapting existing light fixture boxes for use with ceiling fans is often quite difficult since light fixture boxes use smaller fasteners and are generally not strong enough to support fans without substantial reinforcements or special brackets.

An electrical box that is approved for ceiling fan support can also be used to support an electrical device such as a light fixture. The National Electrical Code permits lighting fixtures to be supported by electrical boxes proved for ceiling fan support but not vice-a-versa.

Adapting existing ceiling fan boxes for use with a light fixture or the like is not always easily accomplished, since fasteners for the light fixture are different from the fasteners use with ceiling fans. For example, fasteners used with light fixtures generally smaller in diameter than fasteners used with ceiling fans. Moreover, fixture support fasteners often come in various colors, finishes and lengths as well as with various decorative features which may be difficult, if not impossible to match, in a fastener which can be used with an electrical box approved for use with ceiling fans. A National Electrical Code provision (N.E.C. 370-27 (c)) has been proposed which would require that electrical boxes approved for use with ceiling fans to be installed at most locations in a building, such as in stairways, foyers and bathrooms.

Examples of prior art ceiling fan supports are disclosed in the following U.S. Pat. No. 4,391,428 to Grimes; U.S. Pat. No. 4,880,128 to Jorgensen; U.S. Pat. No. 4,892,211 to Jorgensen; U.S. Pat. No. 5,234,119 to Jorgensen et al.; and U.S. Pat. No. 5,407,088 to Jorgensen et al.

Examples of prior art electrical boxes are disclosed in the following U.S. Pat. No. 4,315,100 to Haslbeck et al.; U.S. Pat. No. 4,580,689 to Slater; U.S. Pat. No. 4,874,905 to Schnell et al.; U.S. Pat. No. 4,954,667 to Jorgensen et al.; and U.S. Pat. No. 5,135,411 to Wiley et al. These electrical boxes generally have mounting tabs that extend inwardly with screw holes that overlie the internal cavity of the box.

In view of the above noted problems, there exists a need for an electrical box approved for use with ceiling fans that can accommodate both standard light fixture fasteners as well as ceiling fan fasteners and that can receive mounting screws without interfering with the electrical box. This invention addresses this need as well as other needs and problems which will become apparent those skilled in the art from this disclosure.

SUMMARY OF THE INVENTION

The present invention is directed to an electrical box and to an electrical box assembly for supporting an electrical fixture. The invention is particularly directed to an electrical box having mounting holes in the perimeter for mounting an electrical fixture to the box. The mounting holes are positioned so that mounting screws are outside the wall of the electrical box.

Accordingly, one aspect of the invention is to provide an electrical box that is formed as a one piece unitary structure. The one piece electrical box can be formed from a single sheet of metal or other material that is stamped into the desired shape. Alternatively, the electrical box can be molded from a plastic resin material.

Another aspect of the invention is to provide an electrical box with an outwardly extending mounting flange where the box is capable of selectively supporting a ceiling fan or a lighting fixture. The mounting flange has a first aperture for receiving a coupling member such as a screw that is capable of supporting a ceiling fan. A second aperture is provided in the mounting flange for receiving a coupling member for mounting a lighting fixture to the box.

In one embodiment, the electrical box includes a raised portion in a bottom wall and having an aperture for receiving a grounding screw. The raised portion in the bottom wall is spaced from the bottom wall a distance greater than the length of the grounding screw so that the ground screw is received within the cavity formed by the raised portion. The raised portion is also spaced from the bottom wall a distance less than the height of the side wall. In one embodiment, the raised portion forms a ground screw receiving flange that is formed in the side wall of the electrical box.

Another aspect of the invention is to provide an electrical box having a side wall with a non-linear shaped recess and a mounting flange extending outwardly from the side wall and overlying the recess.

The various features of the invention are basically attained by providing an electrical ceiling box for supporting an electrical device. The box comprises a bottom wall with a substantially circular side wall coupled to the bottom wall which has a concave inner surface, a convex outer surface, and at least one recessed portion. The recessed portion has a concave outer surface connected to the convex surface of the side wall and a convex inner surface connected to the concave inner surface of the side wall.

The aspects of the invention are also attained by providing a universal electrical ceiling box adapted to support an electrical device which comprises a bottom portion having a plurality of mounting holes adapted for receiving fasteners for mounting the box to a support surface. The bottom portion has an outer edge which defines an outer dimension of the box. A side wall extends from the outer edge in a direction substantially perpendicular to the bottom portion defining an internal cavity. The side wall has an outer surface with a first concave recessed portion which extends in an inward direction with respect to the box. A first flange extends from an upper end of the side wall substantially parallel to the bottom portion and overlies the concave recessed portion in the side wall. The first flange has a plurality of holes which extend therethrough and are adapted for receiving a fastener for coupling the electrical device to the box. The holes in the first flange are aligned with the concave recessed portion and are positioned outwardly with respect to the side wall.

The aspects of the invention are further attained by providing an electrical ceiling box adapted to support an electrical device, which comprises a bottom wall having a peripheral edge and a plurality of mounting holes extending therethrough for receiving a fastener for coupling the box to a support surface. A side wall extends in a substantially perpendicular direction from the peripheral edge of the bottom wall. A first flange extends from the side wall in a radially outward direction. The first flange has a non-linear inner edge coupled to the side wall and an outer radial edge aligned with the peripheral edge of the bottom wall. A plurality of holes extend through the first flange and are adapted for receiving a fastener for coupling the electrical device to the box. A second flange extends from the side wall in a radially outward direction. The second flange has a non-linear inner edge coupled to the side wall and an outer radial edge aligned with the peripheral edge of the bottom wall. A plurality of holes extend through the second flange and are adapted for receiving a fastener for coupling the electrical device to the box. The holes in the first flange and the second flange are oriented outwardly from the side wall.

The aspects of the invention are still further attained by providing an electrical ceiling box adapted to support an electrical device, with the box comprising a bottom wall having an outer edge and a plurality of mounting holes for receiving a fastener for mounting the box to a support. A substantially continuous side wall extends from the outer edge of the bottom wall in a direction substantially perpendicular to the bottom wall and defining an internal cavity. The bottom wall and the side wall have a substantially circular shape. The side wall has a first convex arcuate section with a first end and a second end. A second convex arcuate section has a first end and second end. A first concave arcuate section extends between the first end of the first convex arcuate section and the first end of the second convex arcuate section. A second concave arcuate section extends between the second end of the first convex arcuate section and the second end of the second convex arcuate section. A first flange extends outwardly from an upper end of the side wall at the first concave arcuate section and coextensive with a first recessed area defined by the first concave arcuate section. A second flange extends outwardly from an upper end of the side wall at the second concave arcuate section and is coextensive with a second recessed area defined by the second concave arcuate section.

The aspects of the invention are yet further attained by providing an electrical ceiling box adapted to support an electrical device. The box comprises a bottom wall with an outer edge which has a plurality of mounting holes extending therethrough for receiving a fastener for coupling the box to a support. The bottom wall has a substantially circular shape with a first convex arcuate portion and a second convex arcuate portion. The first and second convex arcuate portions have a first radius. The bottom wall has a first concave arcuate portion which extends between a first end of the first convex arcuate portion and a first end of the second convex arcuate portion. A second concave arcuate portion extends between a second end of the first arcuate portion and a second end of the second arcuate portion. The first and second concave arcuate portions have a second radius less than the first radius. A side wall extends from the outer edge of the bottom wall in a direction substantially perpendicular to the bottom wall. The side wall terminates at an upper end. A first flange portion extends from the upper end of the side wall and overlies the first concave arcuate portion. The first flange has a plurality of mounting holes for receiving a fastener for coupling the electrical device to the box. A second flange portion extends from the upper end of the side wall and overlies the second concave arcuate portion. The second flange has a plurality of mounting holes for receiving a fastener for coupling the electrical device to the box.

The aspects of the invention are still further attained by providing an electrical box for supporting an electrical device which comprises a substantially planar bottom wall having an outer edge and a continuous side wall having a bottom edge connected to the outer edge of the bottom wall and extending in a direction substantially perpendicular to the bottom wall and terminating at a top edge. The side wall forms a substantially circular shape. A recess in the side wall forms a flange having a hole for receiving a ground screw. The flange is integral with the side wall and spaced between the top edge and bottom edge of the side wall.

Other objects, advantages and salient features of the invention will become apparent from the following detailed description of the invention, which taken in conjunction with the annexed drawings disclose preferred embodiments of the invention.

BRIEF DESCRIPTION OF THE DRAWINGS

The following is a brief description of the drawings in which.

DETAILED DESCRIPTION OF THE INVENTION

Figure 1:
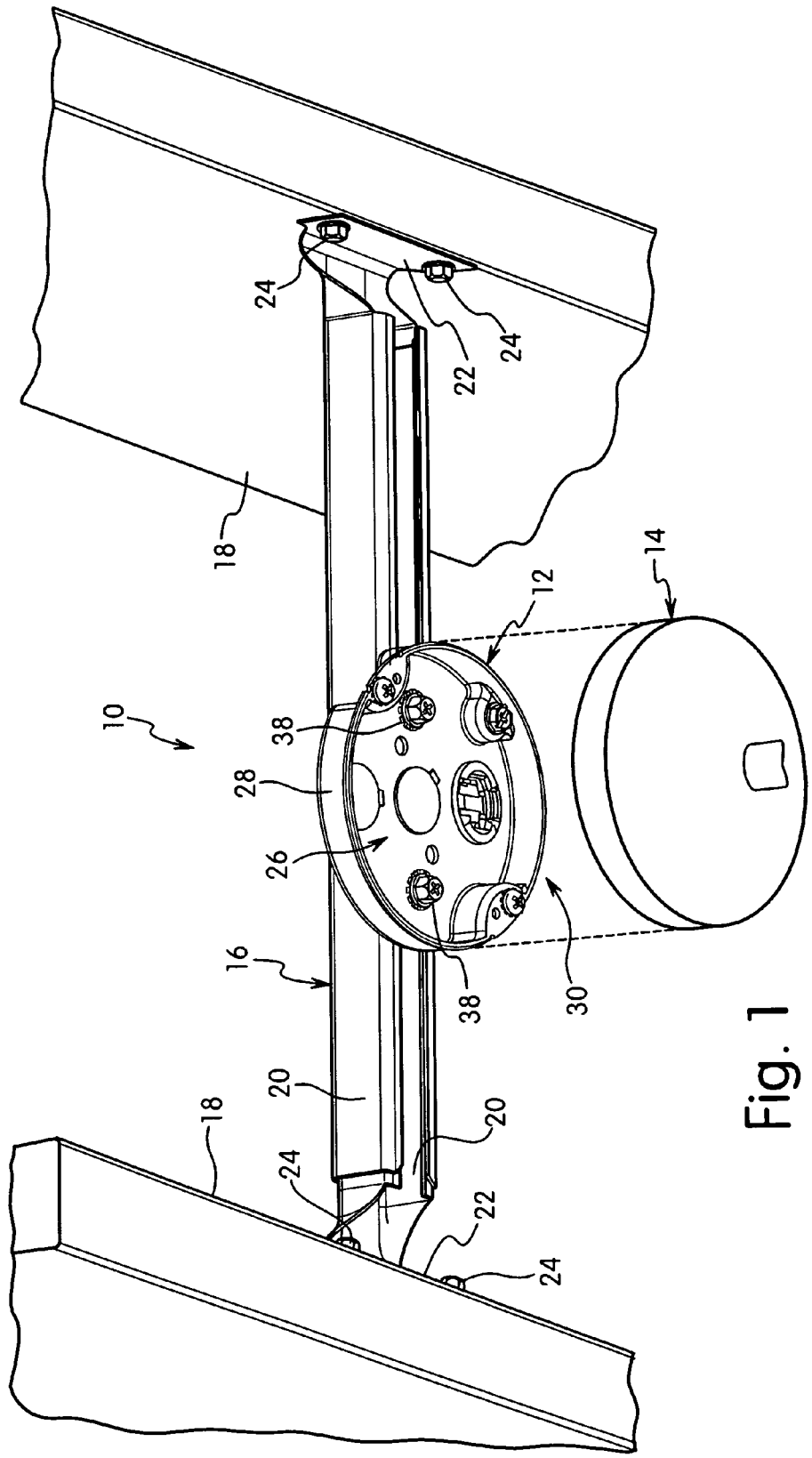
FIG. 1 is a perspective view of the electrical box assembly in a first embodiment showing a ceiling fan mounted to the electrical box.

The present invention is directed to an electrical box and an electrical box assembly for supporting an electrical fixture. The invention is particularly directed to an electrical box having a plurality of mounting holes within the perimeter of the electrical box for receiving fasteners for coupling an electrical fixture to the electrical box. The electrical box typically includes knock-out plugs and mounting holes.

Referring to FIGS. 1–6, a first embodiment of the electrical assembly 10 is shown. Electrical assembly 10 includes an electrical box 12 for supporting an electrical fixture 14. Electrical fixture 14 is typically a ceiling fan or a light fixture. Electrical box 12 is mounted to a suitable support which can be a ceiling joist or other solid surface. In the embodiment illustrated, electrical box 12 is coupled to a support bracket 16 extending between a pair of ceiling joists 18. Bracket 16 as shown includes a pair of telescoping arms 20 to accommodate variations in the spacing between joists 18. Arms 20 include a mounting flange 22 at one end having apertures for receiving fasteners 24 to secure mounting bracket 16 to joists 18. Typically, fasteners 24 are screws or bolts that extend into joists 18 to enable mounting bracket 16 and electrical box 12 to support the intended weight.

Figure 2:
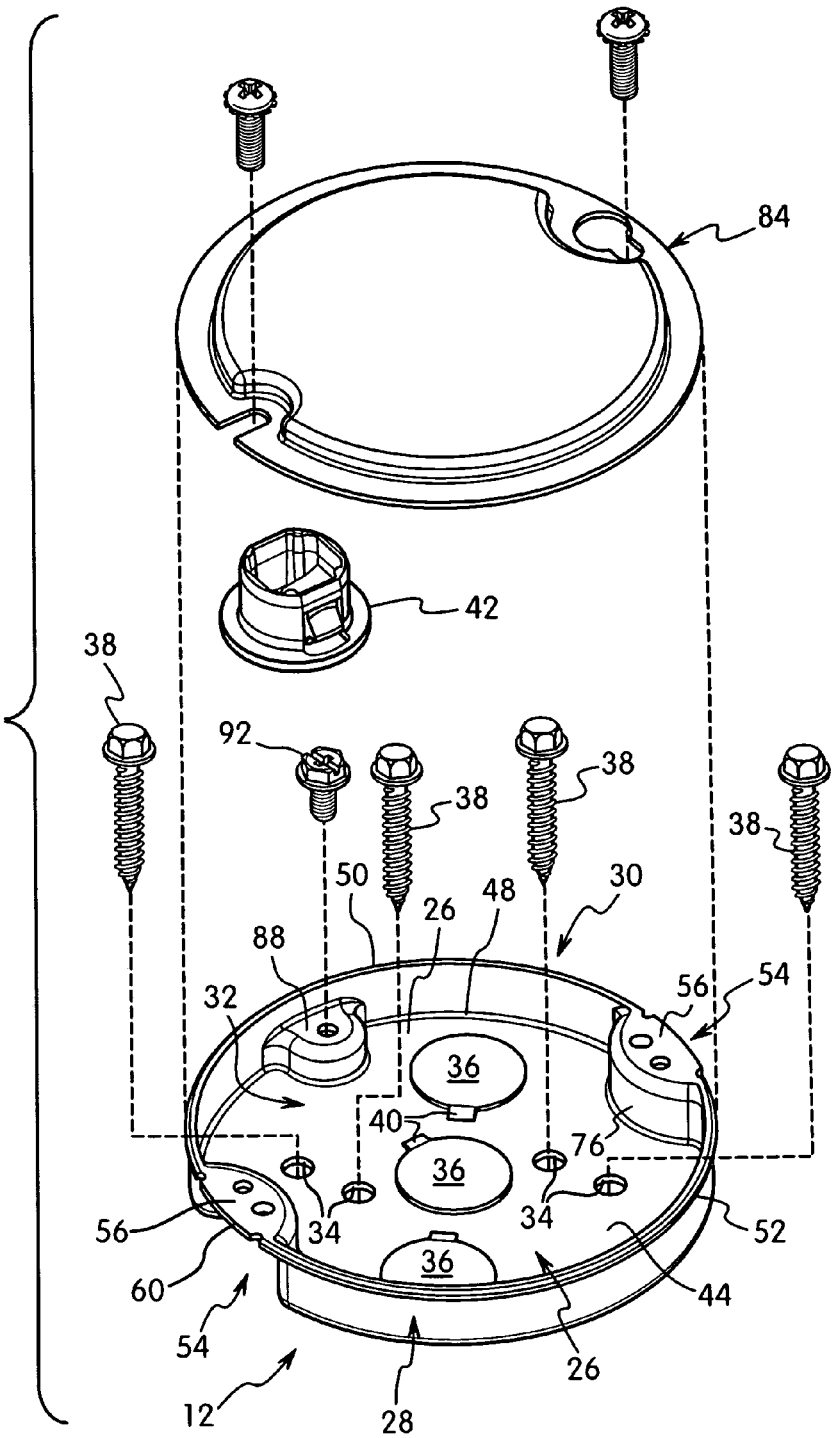
FIG. 2 is a perspective view of the electrical box of FIG. 1 showing a cover member on the electrical box.

Referring to FIG. 2, electrical box 12 includes a bottom portion 26 defining a bottom wall and a side portion 28 defining a side wall to form an open end 30. Bottom portion 26 and side portion 28 define an internal cavity 32 of electrical box 12 for containing wires, electrical connections or other electrical components. It will be understood that the reference to bottom portion 26 as shown in FIG. 2 refers to the bottom end of cavity 32 regardless of the orientation of electrical box 12 when installed for use. For example, electrical box 12 as shown in FIG. 1 is mounted in the ceiling of a structure so that open end 30 faces in a downward direction and bottom portion 26 is oriented at an upper end of electrical box assembly 12.

Bottom portion 26 of electrical box 12 in the embodiment illustrated has a substantially flat planar surface with a plurality of apertures 34 and a plurality of knock-out or pry-out plugs 36. Apertures 34 are positioned to enable electrical box 12 to be attached to the intended support. As shown in FIG. 2, apertures 34 are positioned to receive a fastener for connecting electrical box 12 to mounting bracket 16. Preferably, apertures 34 have a dimension to allow fasteners 38 to pass completely through so that the fasteners can connect with the support surface. Knock-outs 36 are formed by stamping or punching a partial circular cut through bottom portion 26. Knock-outs 36 are formed with a tab 40 to connect knock-outs 36 with bottom portion 26. In the embodiment illustrated, three knock-outs 36 are provided in bottom portion 26 in locations to supply the electrical wiring to the cavity 32 of electrical box 12. One or more of knock-outs 36 are removed by bending tab 40 until broken. Typically, an electric cable connector 42 is fitted into the opening after the knock-out is removed for feeding electrical wires into electrical box 12 in a conventional manner. The electrical cable connector can be a conduit fitting, a connector for armored cable or a connector for non-metallic cables.

Electrical box 12 in the illustrated embodiment has a substantially circular shape formed by bottom portion 26 and side portion 28. Bottom portion 26 has a top surface 44 and a bottom surface 46. Bottom portion 26 has a substantially circular shaped outer edge 48. Side portion 26 is coupled to outer edge 48 of bottom portion 26 and extends away from top surface 44 in a direction substantially perpendicular to the plane of bottom portion 26. Side portion 26 has an upper edge 50 having a lip 52 for mating with an electrical fixture. Side portion 26 has a height so that cavity 32 has a volume sufficient to contain electrical wiring and connectors for connecting a power supply to an electrical fixture.

Side portion 28 has at least one and preferably two recessed portions 54 that form a concave cavity extending inwardly from side portion 28 toward the center of electrical box 12. A mounting flange 56 is formed along the upper edge 58 of recessed portions 54. Mounting flange 56 has an inner edge contiguous with the upper edge 58 of side portion 28 in the recessed portions 54 and is coextensive with recessed portion 54. Mounting flange 56 has an outer edge 60 aligned with side portion 28 so that electrical box 12 has a substantially circular shape with a substantially uniform radius. As shown in FIG. 2, mounting flange 56 is positioned inside the radius of electrical box 12 and side portion 28.

Figure 3:
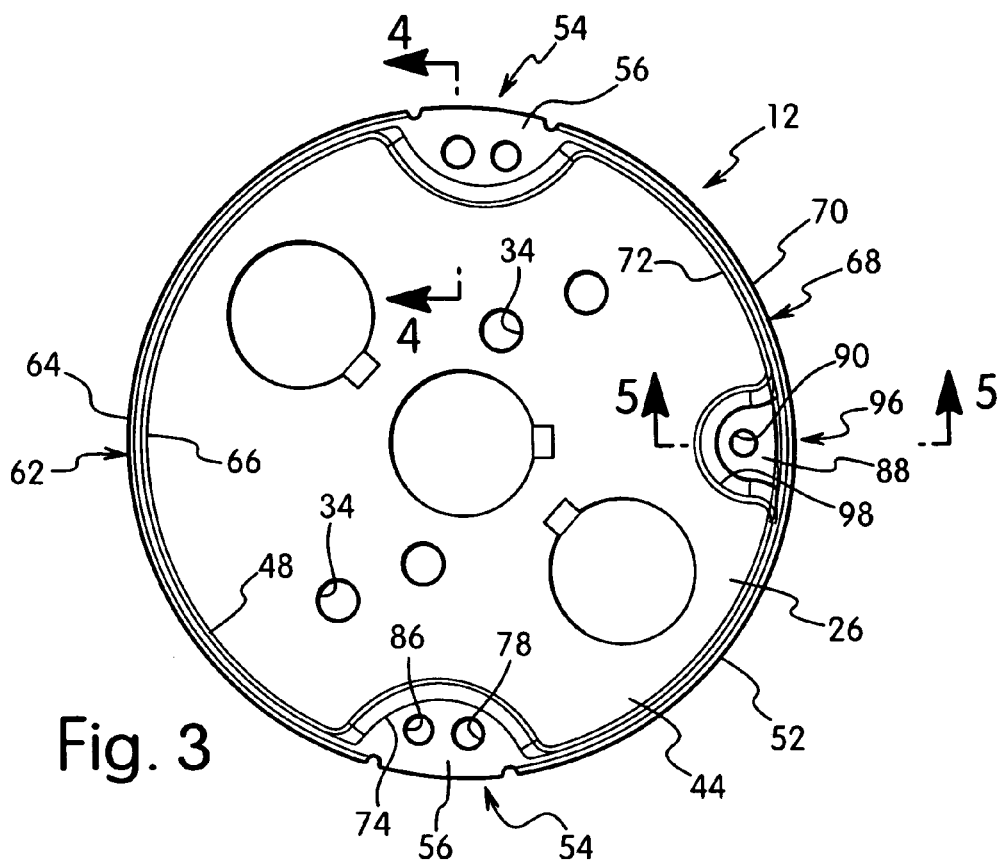
FIG. 3 is a top plan view of the electrical box of FIG. 1.

Side portion 28 has a first arcuate section 62 having a convex outer surface 64 and a concave inner surface 66. Side portion 28 has a second arcuate shaped section 68 having a convex outer surface 70 and a concave inner surface 72. As shown, first arcuate section 62 is diametrically opposed to second arcuate section 68. In the embodiment illustrated, two recessed portions 54 extend between the respective first and second ends of first arcuate section 62 and second arcuate section 68. Recessed portions 54 are preferably non-linear and have a generally continuous curved shape extending between the respective ends of the first arcuate section 62 and second arcuate section 68 of side portion 28. In one embodiment, recessed portions 54 in the embodiment shown have a semi-circular shape forming an outwardly facing concave surface 74 and an inwardly facing convex surface 76. As shown in FIG. 3, recessed portions 54 have a radius less than the radius of side portion 28.

Figure 4:
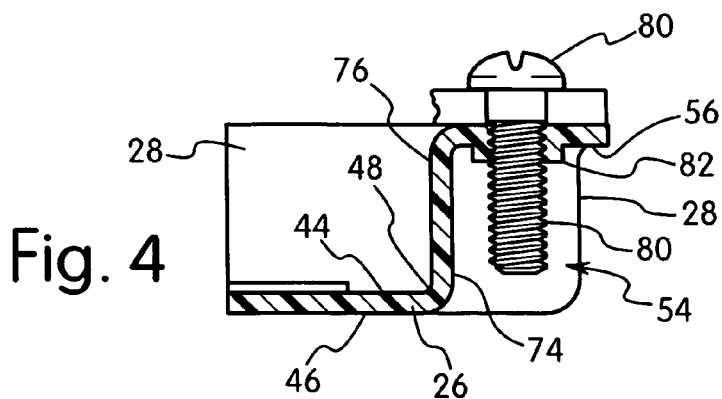
FIG. 4 is a partial cross-sectional view of the flange taken along line 4—4 of FIG. 3.

Mounting flanges 56 are preferably substantially planar and extend substantially perpendicular to side portion 28 and recessed portions 54. Mounting flanges 56 are coplanar with each other and substantially parallel to bottom portion 26 and define a top surface of electrical box 12. Each mounting flange 56 has a pair of spaced-apart mounting holes of different sizes to accommodate different electrical fixtures. Each mounting flange 56 has a first mounting hole 78 formed therein with internal threads for threadedly receiving a screw 80. As shown in FIG. 4, a collar 82 extends from the bottom side of mounting flange 56 surrounding first mounting hole 78. Collar 82 has an axial length less than the height of side portion 28 and has an axial length sufficient to engage the threads of screw 80 to support the weight of the electrical fixture. Collar 82 can be formed by punching or stamping hole 78 or by attaching a separate member to flange 56. Electrical box 12 can include a cover 84 that can be attached to electrical box 12 by screws 80 when an electrical fixture is not mounted to box 12. As shown in FIG. 4, screws 80 have an axial length such that when seated in first mounting hole 78, are spaced a slight distance from bottom portion 26. In this manner, electrical box 12 can be mounted on the flat surface and screws 80 can be threaded into first mounting hole 78 without bottoming out against the support surface. In preferred embodiments, first mounting hole 78 has a threaded internal surface that has a dimension for receiving a 10–32 screw sufficient for mounting and supporting the weight of a ceiling fan.

Each mounting flange 56 includes a second mounting hole 86 that has a diameter slightly less than the diameter of first mounting hole 78. Preferably, second mounting hole 86 has a threaded internal bore for threadedly receiving an 8–32 screw for mounting a lighting fixture or other electrical device to electrical box 12. Each mounting hole 78 and 86 extend completely through mounting flange 56 and have a center axis substantially perpendicular to the plane of mounting flanges 56. In one embodiment, second mounting hole 86 can have a collar on the bottom surface of mounting flange 56 for securely receiving mounting screws.

Figure 5:
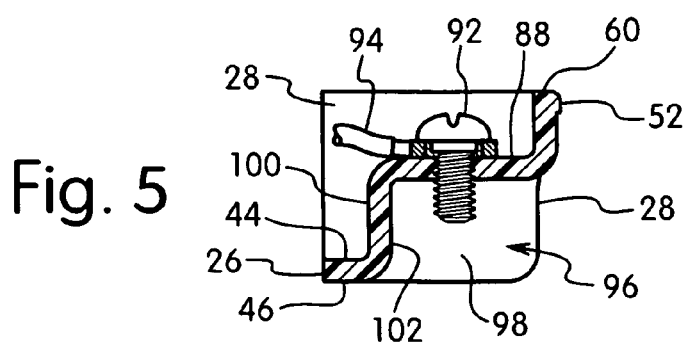
FIG. 5 is a partial cross-sectional view of the flange and ground screw taken along line 5—5 of FIG. 3.
Figure 6:
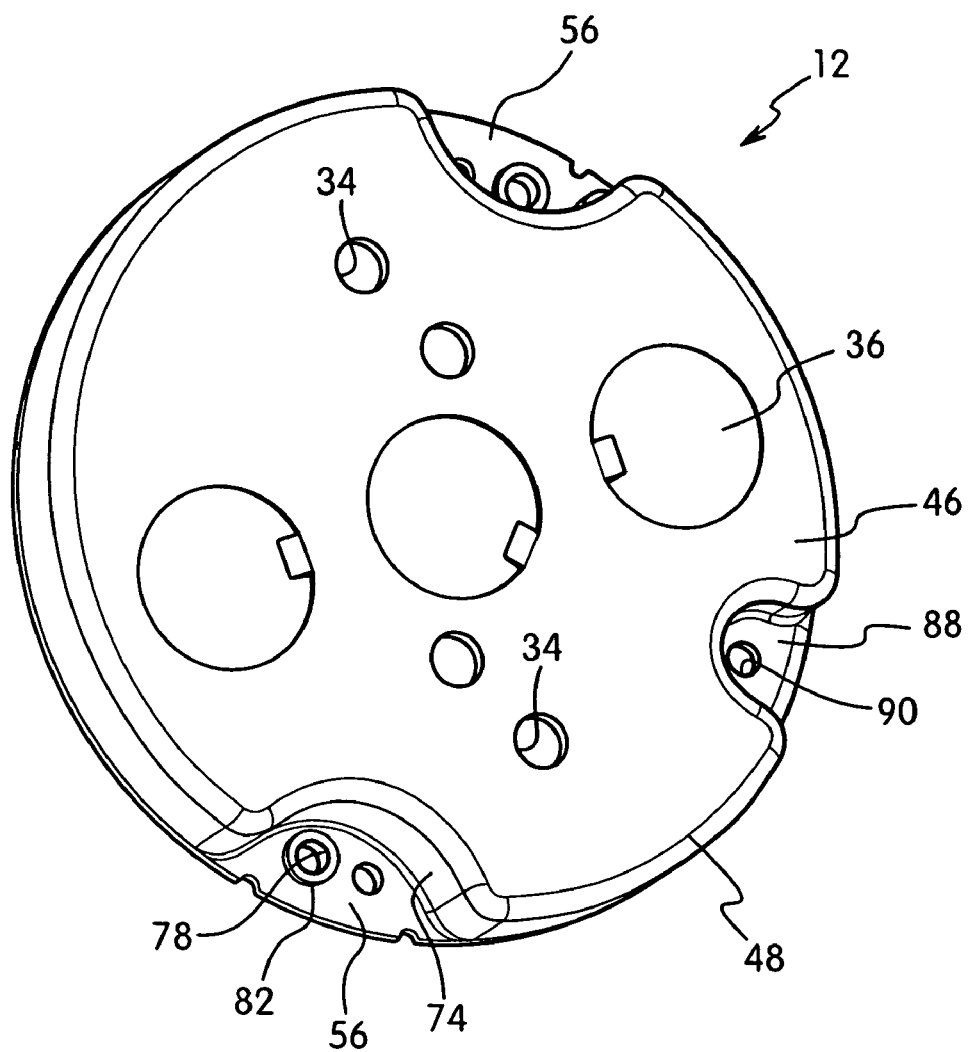
FIG. 6 is a bottom perspective view of the electrical box of FIG. 1.

Referring to FIGS. 1 and 2, electrical box 12 includes a ground wire mounting flange 88 having a threaded aperture 90 for receiving a ground wire screw 92. Screw 92 is threaded into aperture 90 to connect a ground wire 94 to electrical box 12 as shown in FIG. 5. Flange 88 is formed by a concave recessed portion 96 in side portion 28. In one embodiment, recessed portion 96 has an axial height less than an axial height of side portion 28. Recessed portion 96 is formed by an arcuate shaped section 98 extending substantially perpendicular to bottom portion 26 and has a concave outer surface 100 and a convex inner surface 102. In one embodiment, flange 88 is positioned at about a mid-point along the axial height of side portion 28. Screw 92 has an axial length less than the height of arcuate section 98 so that screw 92 is completely received within recessed portion 96. In this manner, electrical box 12 can be mounted against a flat surface and screw 92 can be threaded through aperture 90 to couple ground wire 94 to electrical box 12 without interference from the support surface. Ground screw mounting flange 88 is integrally formed with the side portion 28 and bottom portion 26. It is desirable to position flange 88 close to the top edge of side portion 28 while providing a sufficient space to allow the head of ground screw 92 and ground wire 94 to sit below the top edge of side portion 28.

Electrical box 12 can be made of any suitable material such as plastic or metal. Preferably, bottom portion 26 and side portion 28 has a substantially uniform thickness and is formed as a one-piece unitary member. In one embodiment, electrical box 12 is formed from a single sheet of metal that is stamped or pressed into the desired shape so that each portion has a substantially uniform thickness.

In the embodiment illustrated, electrical box 12 has a substantially circular shape defined by first arcuate section 62 and second arcuate section 68 of side portion 28. First arcuate section 62 and second arcuate section 68 of side portion 28 and the arcuate sections of recessed portions 54 form a continuous side wall of electrical box 12 to contain electrical wiring and connectors. Recessed portions 54 extend inwardly so that mounting flanges 56 are spaced outwardly from the side wall and inwardly from the perimeter of electrical box 12. As shown in FIG. 2, mounting holes 78 and 86 in mounting flanges 56 are spaced inwardly from the outer perimeter of electrical box 12 and separated from the internal cavity 32 of electrical box 12 by the arcuate section of recessed portions 54. Aperture 90 in flange 88 is also spaced inwardly from the outer perimeter of electrical box 12 and separated from cavity 32 by arcuate section 98 to prevent interference of screw 92 with electrical wiring, connectors or other components within cavity 32.

Figure 7:
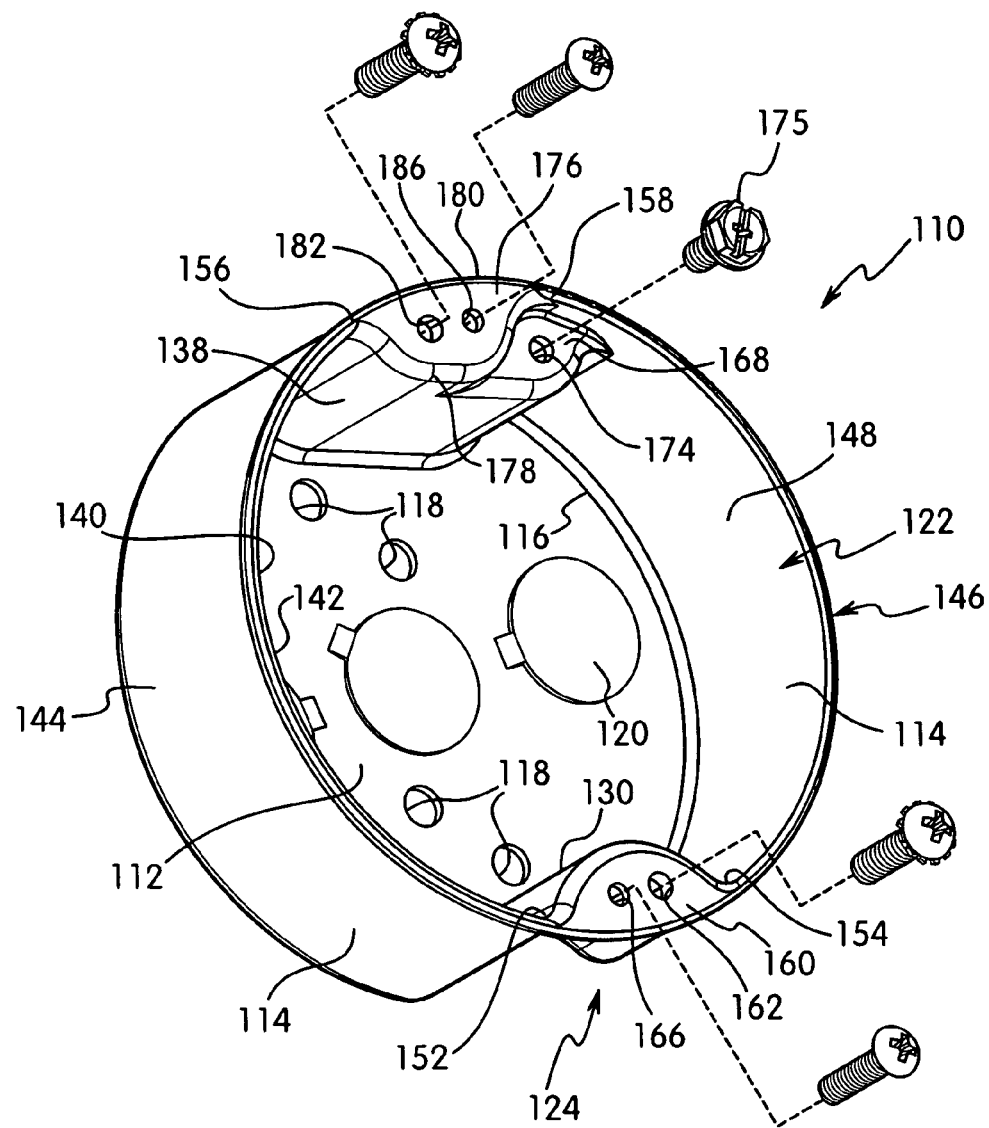
FIG. 7 is a top perspective view of the electrical box in another embodiment.
Figure 8:
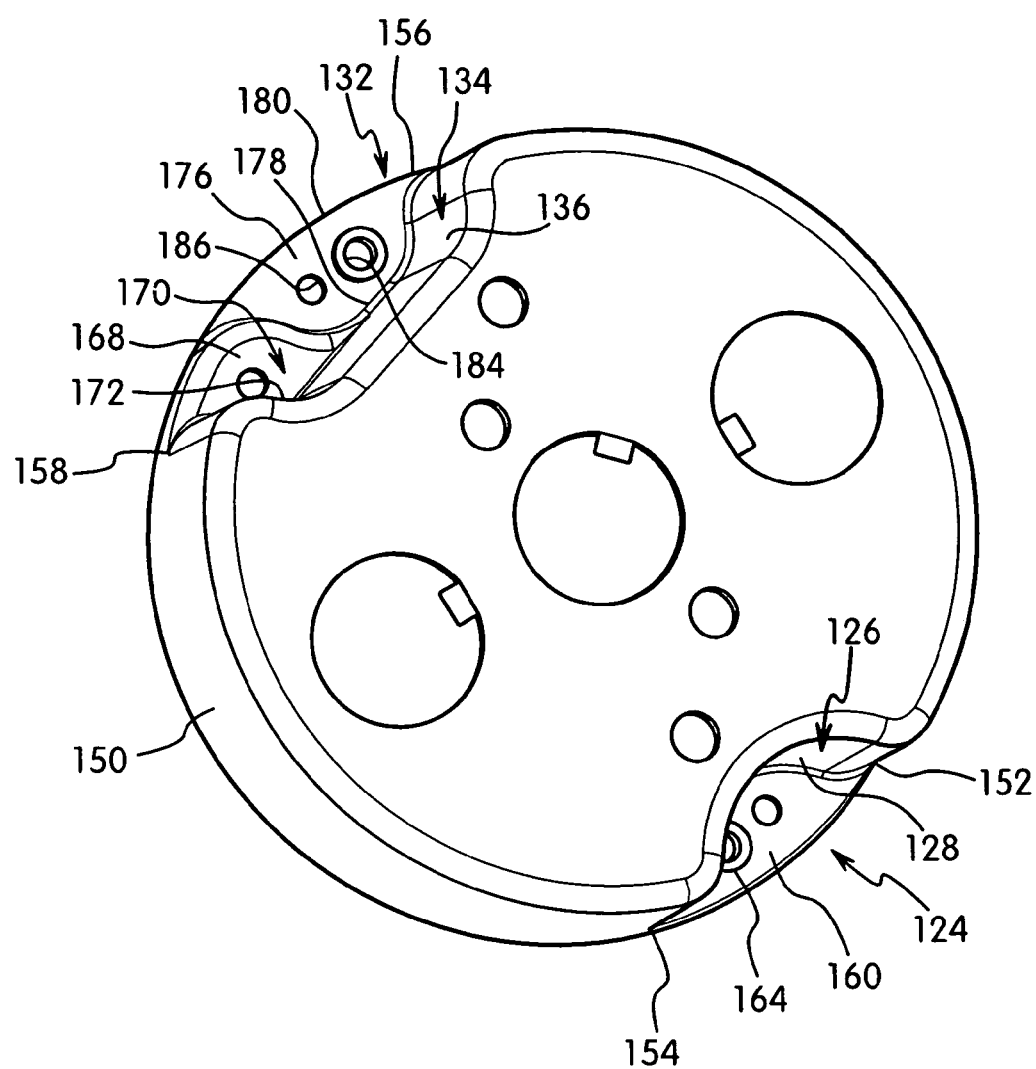
FIG. 8 is a bottom perspective view of the electrical box of FIG. 7.

Referring to FIGS. 7 and 8, a second embodiment of the invention is illustrated. As in the first embodiment, an electrical box 110 is provided having a substantially circular shape formed by a bottom wall 112 and a side wall 114. Bottom wall 112 has a substantially planar surface with a side edge 116. A plurality of mounting holes 118 are provided in bottom wall 112 for receiving a fastener such as a screw for mounting electrical box 110 to a support surface. A plurality of pry-out or knock-outs 120 are provided for supplying electrical wiring to an inner cavity 122 of electrical box 110. Side wall 114 is continuous and has a substantially circular shape.

As in the previous embodiment, side wall 114 has a first recessed portion 124 having a continuous first curved section 126. First curved section 126 has a concave outer surface 128 and a convex inner surface 130. Side wall 114 further has a second recessed portion 132 formed by a second curved section 134. Second curved section 134 has a concave outer surface 136 and a convex inner surface 138. In one embodiment, first curved section 126 and second curved section 134 have a semi-circular shape.

As shown in FIG. 7, side wall 114 is formed by a first arcuate section 140 having a concave inner surface 142 and a convex outer surface 144. Side wall 114 further has a second arcuate section 146 having a concave inner surface 148 and a convex outer surface 150 as shown in FIG. 8. First curved section 126 of first recess 124 extends between a first end 152 of first arcuate section 140 and a first end 154 of arcuate section 146. Curved section 134 of second recessed portion 132 extends between a second end 156 of arcuate section 140 and a second end 158 of arcuate section 146. In this manner, first and second arcuate sections 140 and 146 and curved sections 126 and 134 form a continuous wall of electrical box 110.

Curved section 126 of first recess portion 124 has a height substantially equal to the height of first arcuate section 140 and second arcuate section 146 of side wall 114 and terminates at an upper edge. In the embodiment illustrated, curved section 126 has a substantially semi-circular shape with a radius less than a radius of electrical box 110. A mounting flange 160 is integrally formed with curved section 126 and extends parallel to bottom wall 112. Mounting flange 160 has an inner edge contiguous with curved section 126 and an outer edge aligned with a perimeter of electrical box 110 and extending between first end 152 of arcuate section 140 and first end 154 of arcuate section 146. Mounting flange 160 includes a first mounting hole 162 having internal threads for receiving a mounting screw. As shown in FIG. 8, a threaded collar 164 extends from a bottom surface of mounting flange 160 and surrounds mounting hole 162. A second threaded mounting hole 166 is formed in mounting flange 160 and having a diameter slightly less than the diameter of first mounting hole 162.

In the embodiment of FIGS. 7 and 8, a ground screw mounting flange 168 is contiguous with the curved section 134 of second recessed portion 132. Flange 168 is formed by a recess 170 that is adjacent and contiguous with second recessed portion 132. Recess 170 has a curved wall section 172 extending between second end 158 of arcuate section 148 and curved section 134 of second recess 132. Curved section 172 extends in a direction perpendicular to bottom wall 112 and has a height less than side wall 114. Flange 168 includes a threaded aperture 174 to receive a screw 175 for connecting a ground wire to electrical box 110. Flange 168 is spaced from the top edge of side wall 114 a distance so that ground screw 175 is below the top edge when ground screw 175 is seated against flange 168 to clamp a ground wire to flange 168. Flange 168 is spaced from bottom wall 112 a distance to prevent screw 175 from contacting a support surface when screw 175 is seated against flange 168.

A second mounting flange 176 overlies second recessed portion 132 and is connected to curved section 136. Flange 176 has a curved inner edge 178 and a curved outer edge 180. The ends of inner edge 178 and outer edge 180 are connected to the second ends 156, 158 of arcuate sections 140, 146, respectively. Mounting flange 176 includes a first threaded hole 182 with a collar 184 on the bottom side of flange 176 and a second threaded hole 186.

In each of the embodiments, the electrical box is formed from a single sheet of metal that is stamped or pressed into the desired shape. The electrical box has a continuous side wall with mounting flanges extending outwardly from the side wall but maintained within the overall perimeter of the electrical box. The mounting holes in the flanges receive mounting screws or other fasteners that can extend through the flange for mounting an electrical fixture to the box without interfering with the electrical wires, connectors or other components within the cavity of the electrical box.

While various embodiments have been selected to illustrate the invention, it will be understood by those skilled in the art that various changes and modifications can be made without departing from the scope of the invention as defined in the appended claims.

What is claimed is:

1. A universal electrical ceiling box adapted to support an electrical device comprising:
    a bottom portion having a plurality of mounting holes adapted for receiving fasteners for mounting said box to a support surface, said bottom portion having an outer edge defining an outer dimension of said box;
    a continuous side wall extending from said outer edge in a direction substantially perpendicular to said bottom portion defining an internal cavity, said side wall having an outer surface with a first continuously curved concave recessed portion extending in an inward direction with respect to said box; and
    a first flange extending from an upper end of said side wall substantially parallel to said bottom portion and overlying said concave recessed portion in said side wall, said first flange having a plurality of holes extending therethrough and adapted for receiving a fastener for coupling said electrical device to said box, said holes in said first flange being aligned with said concave recessed portion and being positioned outwardly with respect to said side wall, said first flange has an inner arcuate shaped portion integrally formed with said first concave recessed portion of said side wall and an outer arcuate shaped portion having a radius of curvature substantially equal to a radius of curvature of said side wall.

2. The ceiling box of claim 1, wherein
    said side wall has a first arcuate shaped section and a second arcuate shaped section with a first radius of curvature; and
    said first concave recessed portion extends between a first end of said first arcuate shaped section and a second end of said second arcuate shaped section, and where said first concave recessed portion has a substantially arcuate shape with a second radius of curvature that is less than said first radius of curvature.

3. The ceiling box of claim 1, wherein
    said side wall has a second concave recessed portion and a second flange extending from the upper end of said side wall and overlying said second recessed portion.

4. The ceiling box of claim 3, wherein
    said second concave recessed portion has an arcuate shape with a radius of curvature less than the radius of curvature of said side wall.

5. The ceiling box of claim 4, wherein
    said second flange has an inner arcuate shaped portion integrally formed with said second concave recessed portion of said side wall and an outer arcuate shaped portion having a radius of curvature substantially equal to the radius of curvature of said side wall.

6. The ceiling box of claim 1, further comprising
    a raised portion formed in said bottom portion and having a substantially planar surface parallel to said bottom portion and having a height less than a height of said side wall, said raised portion having a hole for receiving a screw to connect a ground wire to said box, said raised portion forming a recess on an outer face of said bottom portion.

7. The ceiling box of claim 6, wherein
    said raised portion is spaced from said side wall.

8. The ceiling box of claim 6, wherein
    said raised portion is contiguous with said first concave recessed portion.

9. An electrical ceiling box for supporting an electrical device, said box comprising:
    a bottom wall;
    a substantially circular side wall having a bottom end coupled to said bottom wall and having a concave inner surface, a convex outer surface, and at least one recessed portion, said recessed portion having a continuously curved concave outer surface connected to said convex outer surface of said side wall and a continuously curved convex inner surface connected to said concave inner surface of said side wall; and
    a mounting flange integrally formed with said side wall and said recessed portion and extending outwardly from a top end of said side wall to overlie said recessed portion.

10. The electrical ceiling box of claim 9, wherein
    said concave outer surface of said recessed portion has a substantially arcuate shape and said flange has an inner edge with a substantially arcuate shape with a length substantially equal to a length of said recessed portion.

11. The electrical ceiling box of claim 9, wherein
    said recessed portion is contained completely within a radius of said side wall and said mounting flange.

12. The electrical ceiling box of claim 11, wherein
    said mounting flange is contained completely within said radius of said side wall and is coextensive with said recessed portion.

13. The electrical ceiling box of claim 9, further comprising
    a raised portion in said bottom wall and having an aperture for receiving a ground screw, said raised portion forming a recess on an outer face of said bottom wall.

14. The electrical box of claim 13, wherein
    said raised portion in said bottom wall is integrally formed with said recessed portion in said side wall, said raised portion forming a surface positioned between said bottom wall and said top end of said side wall.

15. An electrical ceiling box adapted to support an electrical device and formed as a one piece integral unit, comprising:
- a bottom wall having a peripheral edge and a plurality of mounting holes extending therethrough for receiving a fastener for coupling said box to a support surface;
- a side wall extending in a substantially perpendicular direction from said peripheral edge of said bottom wall and encircling said peripheral edge to define an internal cavity with an open top end;
- a first flange extending from a top edge of said side wall in a radially outward direction, said first flange having a non-linear inner edge coupled to said side wall and an outer radial edge aligned with said peripheral edge of said bottom wall, and a plurality of holes extending through said first flange and adapted for receiving a fastener for coupling said electrical device to said box;
- a second flange extending from said top edge of said side wall in a radially outward direction, said second flange having a non-linear inner edge coupled to said side wall and an outer radial edge aligned with said peripheral edge of said bottom wall, and a plurality of holes extending through said second flange and adapted for receiving a fastener for coupling said electrical device to said box;
- wherein said holes in said first flange and said second flange are oriented outwardly from said side wall.

16. The ceiling box of claim 15, wherein
said bottom wall has a first concave arcuate recessed portion and a second concave arcuate recessed portion, and where said side wall has a first concave recessed portion and a second concave recessed portion, said first flange being coextensive with said first concave recessed portion of said side wall, and said second flange being coextensive with said second concave recessed portion of said side wall.

17. The ceiling box of claim 16, wherein
said inner edge of said first flange is integrally formed with said first concave recessed portion of said side wall; and
said inner edge of said second flange has an inner portion integrally formed with said second concave recessed portion of said side wall.

18. The ceiling box of claim 17, wherein
said first and second recessed portion of said bottom wall have a substantially arcuate shape.

19. The ceiling box of claim 17, wherein
said first flange and said second flange have an outer edge aligned with said side wall.

20. The ceiling box of claim 19, wherein
said side wall has a substantially annular shape with an arcuate portion having a first radius of curvature; and
said first flange and said second flange have an outer edge with a radius of curvature equal to said radius of curvature of said side wall.

21. An electrical ceiling box adapted to support an electrical device, said box comprising:
- a bottom wall having an outer edge and a plurality of mounting holes for receiving a fastener for mounting said box to a support;
- a substantially continuous side wall extending from said outer edge of said bottom wall in a direction substantially perpendicular to said bottom wall and defining an internal cavity, said bottom wall and said side wall having a substantially circular shape, said side wall having a first convex arcuate section with a first end and a second end, a second convex arcuate section having a first end and second end, a first concave arcuate section extending between said first end of said first convex arcuate section and said first end of said second convex arcuate section, and a second concave arcuate section extending between said second end of said first convex arcuate section and said second end of said second convex arcuate section;
- a first flange extending outwardly from an upper end of said side wall at said first concave arcuate section and coextensive with a first recessed area defined by said first concave arcuate section;
- a second flange extending outwardly from an upper end of said side wall at said second concave arcuate section and coextensive with a second recessed area defined by said second concave arcuate section; and
- wherein said first and second convex arcuate sections and outer edges of said first and second flanges form a continuous circular upper edge of said box.

22. The ceiling box of claim 21, wherein
said first and second flanges are substantially parallel to said bottom wall and coupled to said first and second concave sections of said side wall, respectively, to resist bending of said first and second flanges with respect to said side wall.

23. The ceiling box of claim 22, wherein
said first flange outer edge extending between said first end of said first convex arcuate section and said first end of second convex arcuate section; and
said second flange outer edge extending between said second end of said first convex arcuate section and said second end of said second convex arcuate sections.

24. The ceiling box of claim 21, wherein
said first flange has a plurality of mounting holes for receiving a fastener and positioning the fastener in said first recessed area outside said internal cavity of said box; and
said second flange has a plurality of mounting holes for receiving a fastener and positioning the fastener in said second recessed area outside said internal cavity of said box.

25. The ceiling box of claim 21, wherein
said first flange and said second flange have an arcuate shaped edge coupled to said first concave arcuate section and said second concave arcuate section, respectively.

26. The ceiling box of claim 21, wherein
said box is a one piece integrally formed unit.

27. The ceiling box of claim 26, wherein
said box is made of metal.

28. The ceiling box of claim 21, further comprising
a raised portion in said bottom wall, said raised portion having a threaded hole for receiving a screw for coupling to a ground wire.

29. The ceiling box of claim 28, wherein
said raised portion has a height less than a height of said side wall and forms a recess on a bottom side of said bottom wall.

30. The ceiling box of claim 29, wherein
said raised portion is spaced from said side wall.

31. The ceiling box of claim 28, wherein
said raised portion is contiguous with said side wall.

32. The ceiling box of claim 28, wherein
said raised portion is contiguous with said first recessed portion in said side wall, and where said raised portion is spaced from said bottom wall a distance less than a distance of said first flange from said bottom wall.

33. An electrical ceiling box adapted to support an electrical device and formed as a one piece unitary unit, said box comprising:

a bottom wall with an outer edge and having a plurality of mounting holes extending therethrough for receiving a fastener for coupling said box to a support, said bottom wall having a substantially circular shape with a first convex arcuate portion and a second convex arcuate portion, said first and second convex arcuate portions having a first radius, said bottom wall having a first concave arcuate portion extending between a first end of said first convex arcuate portion and a first end of said second convex arcuate portion, and a second concave arcuate portion extending between a second end of said first convex arcuate portion and a second end of said second convex arcuate portion, said first and second concave arcuate portions having a second radius less than said first radius;

a side wall extending from said outer edge of said bottom wall in a direction substantially perpendicular to said bottom wall, said side wall terminating at an upper end;

a first flange portion extending from said upper end of said side wall and overlying said first concave arcuate portion, said first flange having a plurality of mounting holes for receiving a fastener for coupling said electrical device to said box, said first flange having an inner arcuate shaped portion integrally formed with said side wall; and a second flange portion extending from said upper end of said side wall and overlying said second concave arcuate portion, said second flange having a plurality of mounting holes for receiving a fastener for coupling said electrical device to said box, said second flange having an inner arcuate shaped portion integrally formed with said side wall.

* * * * *